US012726047B2

(12) United States Patent
Yoon et al.

(10) Patent No.: US 12,726,047 B2
(45) Date of Patent: Sep. 1, 2026

(54) METHOD AND DEVICE FOR CONTROLLING RESONANT INDUCTOR FOR IMPLEMENTING ZVS IN PUSH-PULL PARALLEL RESONANT INVERTER OF WIRELESS POWER TRANSMISSION DEVICE

(71) Applicant: ELECTRONICS AND TELECOMMUNICATIONS RESEARCH INSTITUTE, Daejeon (KR)

(72) Inventors: Kye Seok Yoon, Suwon-si (KR); Gwang Zeen Ko, Daejeon (KR); Sang Won Kim, Daejeon (KR); Seong Min Kim, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 149 days.

(21) Appl. No.: 18/922,921

(22) Filed: Oct. 22, 2024

(65) Prior Publication Data

US 2025/0141271 A1 May 1, 2025

(30) Foreign Application Priority Data

Oct. 30, 2023 (KR) ........................ 10-2023-0146572
Aug. 29, 2024 (KR) ........................ 10-2024-0116574

(51) Int. Cl.
*H02J 50/12* (2016.01)
*H02M 1/00* (2006.01)
(Continued)

(52) U.S. Cl.
CPC ........... *H02J 50/12* (2016.02); *H02M 1/0058* (2021.05); *H02M 7/4815* (2021.05); *H02M 7/5381* (2013.01); *H02M 7/5387* (2013.01)

(58) Field of Classification Search
CPC .... H02J 50/12; H02M 7/4815; H02M 1/0058; H02M 7/5381; H02M 7/5387
See application file for complete search history.

(56) References Cited

U.S. PATENT DOCUMENTS 4,841,220 A * 6/1989 Tabisz ............... H02M 3/33571 363/16
4,931,716 A * 6/1990 Jovanovic ......... H02M 3/33576 323/224
(Continued)

FOREIGN PATENT DOCUMENTS

KR 10-1405878 B1 6/2014
KR 10-2016-0017560 A 2/2016
(Continued)

*Primary Examiner* — Rafael O Leon De Domenech

(57) ABSTRACT

A method and device for controlling a resonant inductor for implementing ZVS in a push-pull parallel resonant inverter is closed. The present disclosure provides A device comprising: a converter including a full-bridge circuit in which a first switch and a second switch form a first leg and a third switch and a fourth switch form a second leg and configured to convert a DC into an AC by turning on or off the switches; a resonant inductor circuit including a resonant inductor and a resonant switch connected in series and connected between two output nodes of the converter; a transmission coil connected in parallel with the resonant inductor circuit; and a controller configured to convert the DC into the AC by providing a switching timing for turning on or off the switches and control a switching timing of the resonant switch based on switching timings of the switches.

12 Claims, 7 Drawing Sheets

(51) Int. Cl.

| | |
|---|---|
| ***H02M 7/48*** | (2007.01) |
| ***H02M 7/5381*** | (2007.01) |
| ***H02M 7/5387*** | (2007.01) |

(56) References Cited

U.S. PATENT DOCUMENTS

| | | | | |
|---|---|---|---|---|
| 7,915,874 | B1 * | 3/2011 | Cuk ...................... | H02M 3/158 323/224 |
| 8,558,412 | B2 | 10/2013 | Kim et al. | |
| 10,186,971 | B1 | 1/2019 | Xue et al. | |
| 10,452,143 | B2 | 10/2019 | Moon et al. | |
| 2013/0099588 | A1 * | 4/2013 | Yeo ......................... | H02J 50/12 307/104 |
| 2013/0300210 | A1 | 11/2013 | Hosotani | |
| 2016/0079766 | A1 | 3/2016 | Jeong et al. | |
| 2017/0229921 | A1 | 8/2017 | Hwang et al. | |
| 2021/0135666 | A1 | 5/2021 | Wang et al. | |
| 2022/0285994 | A1 | 9/2022 | Danilovic | |
| 2023/0198374 | A1 | 6/2023 | Deng et al. | |

FOREIGN PATENT DOCUMENTS

| | | | |
|---|---|---|---|
| KR | 10-2016-0030802 | A | 3/2016 |
| KR | 10-2016-0058794 | A | 5/2016 |
| KR | 10-2022-0081330 | A | 6/2022 |
| WO | 2015/038369 | A1 | 3/2015 |

* cited by examiner

METHOD AND DEVICE FOR CONTROLLING RESONANT INDUCTOR FOR IMPLEMENTING ZVS IN PUSH-PULL PARALLEL RESONANT INVERTER OF WIRELESS POWER TRANSMISSION DEVICE

CROSS-REFERENCE TO RELATED APPLICATIONS

This application claims priority to Patent Application No. 10-2023-0146572, filed on Oct. 30, 2023 and No. 10-2024-0116574, filed on Aug. 29, 2024 in Korea, the entire contents of which are incorporated herein by reference.

TECHNICAL FIELD

The present disclosure relates to a method and device for controlling a resonant inductor for implementing ZVS in a push-pull parallel resonant inverter of a wireless power transmission device.

BACKGROUND

The content described below merely provides background information related to the present embodiment and does not constitute prior art.

As various technologies have developed, our lives have become more convenient and affluent and thus the quality of life has improved. One of such technologies is wireless power transmission.

Wireless power transmission is a technology for transferring energy from a source to a load using a coil instead of a wire.

The principle of wireless power transmission is based on two laws: Fleming's rule, which states that a magnetic field is formed when a current flows through a conductor, and Lenz's law, which states that when a magnetic flux changes, an induced electromotive force is generated in the coil in a direction in which the change in the magnetic flux is hindered.

Although the wireless power transmission (WPT) technology using radio frequency (RF) first experimented by Nikola Tesla was introduced in the early 20th century, it did not receive much attention at the time.

Since then, wireless power transmission technology has been applied to actual industries only in limited fields (e.g., electric toothbrushes, electric razors, and wireless kettles), but in 2007, the professor Marin Soljacic's research team from the MIT Department of Physics announced the results of a study using a new technology called magnetic resonance with a high Q-factor to light a lamp wirelessly from a distance of 2.4 m, which began to attract attention from academia and industry.

In particular, with the popularization of smartphones, interest in wireless power transmission technology that allows free battery charging anytime and anywhere without a wired charger has increased, and as the number of electric vehicle users has increased, research on wireless charging technology that provides freedom in battery charging while being safe from short circuits and disconnections has been actively conducted.

The most important factor in a wireless power transmission system is efficiency.

Even if a convenient charging service is provided, if the efficiency is low, the power loss is likely to be generated as heat and lead to an accident.

There are many causes of power loss in an inverter of a wireless power transmission system, and one of the major factors is a switching operation.

To eliminate such a switching loss, switching operation can be performed in a situation in which the voltage across both ends of a power semiconductor used in an inverter or a rectifier is 0, which is called zero voltage switching (ZVS).

Up to now, much research has been conducted on ZVS operation in wireless power transmission systems.

FIG. 1 is a diagram illustrating an example of a wireless power transmission system structure and a control method for a conventional ZVS operation.

The method illustrated in FIG. 1 is a method of finding ZVS conditions by controlling the phase and frequency of the inverter and performing ZVS operation. Since this method finds ZVS operation by using a complex feedback control loop, it has the disadvantage of requiring a lot of resources.

FIG. 2 is a diagram illustrating another example of a wireless power transmission system structure and a control method for a conventional ZVS operation.

The method illustrated in FIG. 2 also finds ZVS conditions by controlling the phase duty cycle of an inverter and a rectifier to perform operation. Since this method also finds ZVS operation using a complex feedback control loop, it has a disadvantage of requiring a lot of resources.

FIG. 3 is a diagram illustrating another example of a wireless power transmission system structure for a conventional ZVS operation.

The method illustrated FIG. 3 implements ZVS operation using an additional inductor and capacitor 350 and 340. This method can be implemented simply because it does not use a complex feedback control loop, but it has the burden of using two additional inductors and capacitors.

SUMMARY

An object of the present disclosure is to provide a method and device for controlling a resonant inductor for implementing ZVS in a push-pull parallel resonant inverter of a wireless power transmission apparatus.

The problems to be solved by the present disclosure are not limited to the problems mentioned above, and other problems not mentioned will be clearly understood by those skilled in the art from the description below.

According to at least an aspect, the present disclosure provides A wireless power transmission device comprising: a power converter including a full-bridge circuit in which a first switch and a second switch form a first leg and a third switch and a fourth switch form a second leg and configured to convert a direct current (DC) input into an alternating current (AC) output by turning on or off the first to fourth switches; a resonant inductor circuit including a resonant inductor and a resonant switch connected in series with each other and connected between two output nodes of the power converter; a power transmission coil connected in parallel with the resonant inductor circuit between the two output nodes; and a controller configured to convert the DC input into the AC output by providing a switching timing for turning on or off the first to fourth switches and control a switching timing of the resonant switch based on switching timings of the first to fourth switches.

According to another aspect, the present disclosure provides A wireless power transmission method of a wireless power transmission device including a power converter including a full-bridge circuit in which a first switch and a second switch form a first leg and a third switch and a fourth switch form a second leg, a resonant inductor circuit including a resonant inductor and a resonant switch connected in series with each other, and a power transmission coil connected in parallel with the resonant inductor circuit, the wireless power transmission method comprising: a first control process of providing a switching timing for turning on or off the first to fourth switches to convert a DC input of the power converter into an AC output; and a second control process of controlling a switching timing of the resonant switch based on switching timings of the first to fourth switches.

Advantageous Effects

As described above, according to an embodiment of the present disclosure, a wireless power transmission device and method can be implemented simply since a sensing circuit and a feedback control block are not required, and thus products with price competitiveness can be produced.

In addition, since an open loop control method is used instead of a complex feedback loop control, it is possible to achieve operation with high efficiency in a wide frequency operation range.

The effects of the present disclosure are not limited to the effects mentioned above, and other effects that are not mentioned will be clearly understood by those skilled in the art from the description below.

DETAILED DESCRIPTION

Figure 1:
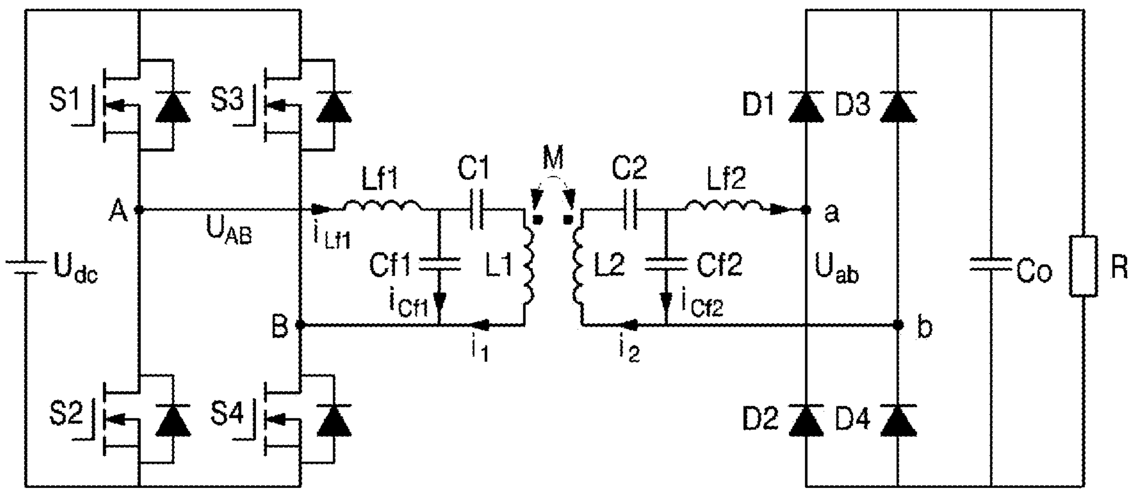
FIG. 1 is a diagram illustrating an example of a wireless power transmission system structure and a control method for a conventional ZVS operation.
Figure 2:
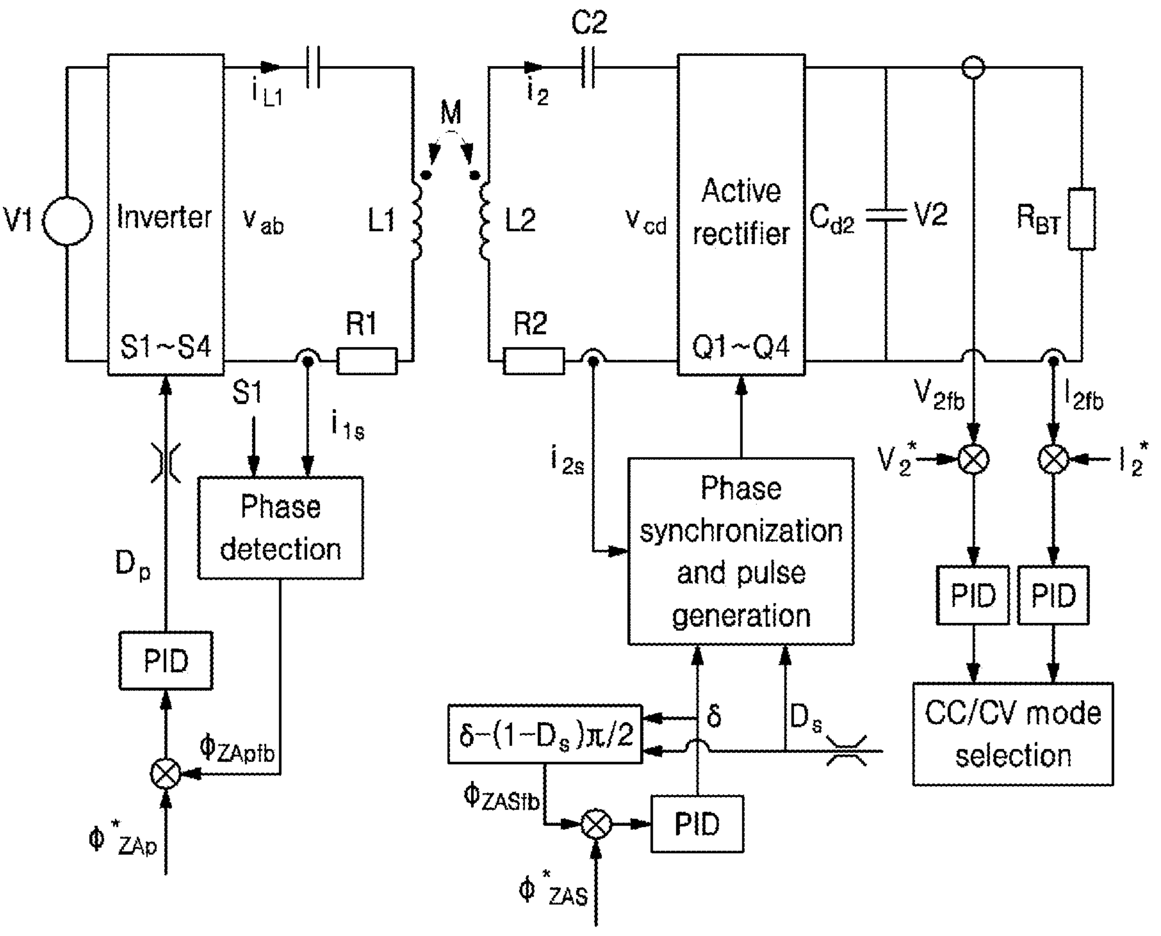
FIG. 2 is a diagram illustrating another example of a wireless power transmission system structure and a control method for a conventional ZVS operation.
Figure 3:
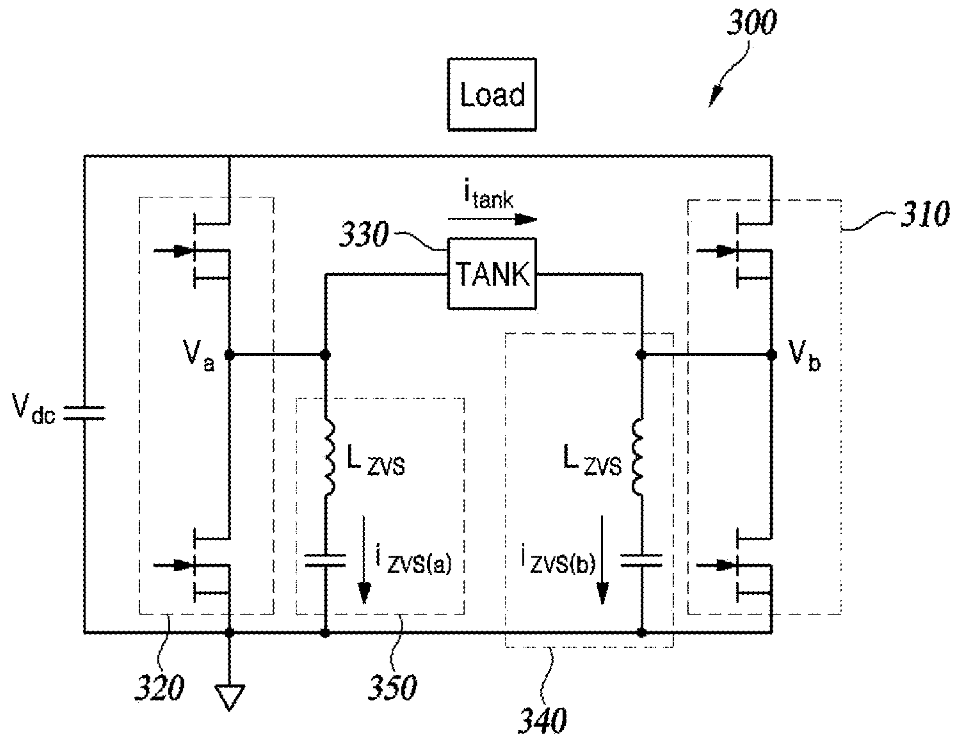
FIG. 3 is a drawing illustrating another example of a wireless power transmission system structure for a conventional ZVS operation.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

Figure 4:
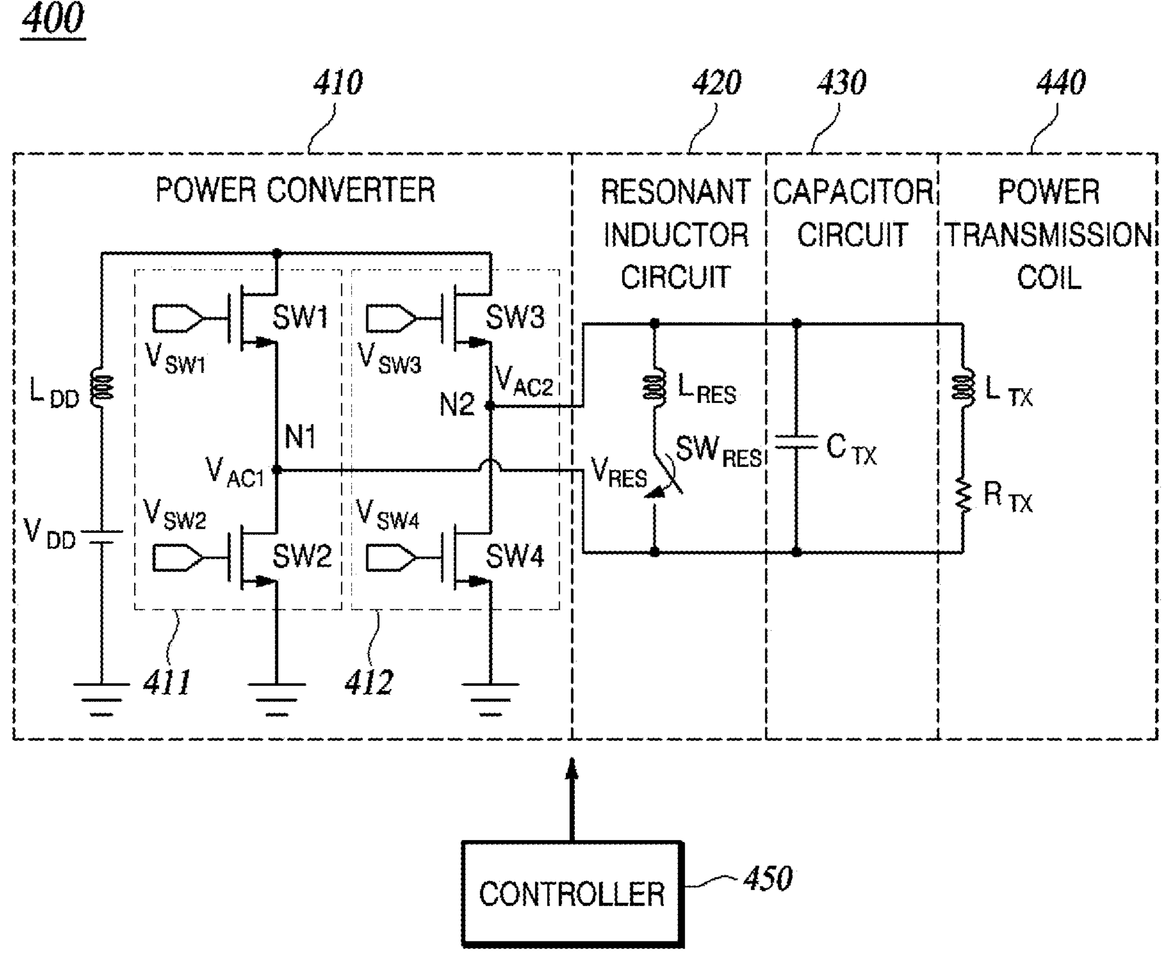
FIG. 4 is a diagram illustrating a wireless power transmission device according to an embodiment of the present disclosure.

FIG. 4 is a diagram illustrating a wireless power transmission device according to an embodiment of the present disclosure.

As illustrated in FIG. 4, the wireless power transmission device 400 according to the present embodiment includes a power converter 410, a resonant inductor circuit 420, a capacitor circuit 430, a power transmission coil 440, and a controller 450. The wireless power transmission device 400 according to the present embodiment may be implemented by omitting some of the components of FIG. 4 or by adding other components that are not illustrated in FIG. 4.

The power converter 410 includes a circuit in which four switches SW1, SW2, SW3, and SW4 are arranged in a full-bridge form, and converts a DC input voltage from a power supply VDD into an AC output voltage.

The four switches include a first switch SW1, a second switch SW2, a third switch SW3, and a fourth switch SW4 and form a first leg 411 and a second leg 412 that are connected in parallel with each other.

The first leg 411 includes the first switch SW1 and the second switch SW2 that are connected in series. The positive terminal of the second switch SW2 is connected to the negative terminal of the first switch SW1.

The second leg 412 includes the third switch SW3 and the fourth switch SW4 that are connected in series. The positive terminal of the fourth switch SW4 is connected to the negative terminal of the third switch SW3.

In the power converter 410, the first leg 411 and the second leg 412 that are connected in parallel with each other are connected to both ends of the power supply VDD, and a first inductor LDD is connected in series to the power supply VDD.

The power converter 410 converts the DC voltage generated from the power supply VDD into am AC voltage and outputs the AC voltage to two output nodes N1 and N2.

The first output node N1 is the connection point between the first switch SW1 and the second switch SW2, and the second output node N2 is the connection point between the third switch SW3 and the fourth switch SW4.

The resonant inductor circuit 420 includes a resonant inductor LRES and a resonant switch SWRES which are connected in series, and is connected between the two output nodes N1 and N2 of the power converter 410.

The capacitor circuit 430 includes a power transmission capacitor CTX and is connected in parallel with the resonant inductor circuit 420 between the two output nodes N1 and N2. The power transmission coil 440 includes a coil element LTX and is connected in parallel with the resonant inductor circuit 420 between the two output nodes N1 and N2.

The power transmission coil 440 may include a coil element LTX and a resistance element RTX connected in series or may include an internal resistance of the coil element LTX.

The controller 450 controls the first switch SW1 and the fourth switch SW4 such that the first switch SW1 and the fourth switch SW4 are turned on or off at the same time. In addition, the controller 450 controls the second switch SW2 and the third switch SW3 such that the second switch SW2 and the third switch SW3 are turned on or off at the same time.

In the following description, a voltage with respect to a first switch timing at which the first switch SW1 and the fourth switch SW4 are controlled to be turned on or off at the same time is denoted by VSW1, and a voltage with respect to a second switch timing at which the second switch SW2 and the third switch SW3 are controlled to be turned on or off at the same time is denoted by VSW2.

Here, the first switch SW1 and the fourth switch SW4 are turned off when VSW1 is 0, and the first switch SW1 and the fourth switch SW4 are turned on when VSW1 is 1. Similarly, the second switch SW2 and the third switch SW3 are turned off when VSW2 is 0, and the second switch SW2 and the third switch SW3 are turned on when VSW2 is 1.

The controller 450 controls ON or OFF of the resonant switch SWRES based on switching timings of the first to fourth switches SW1, SW2, SW3, and SW4. In the following description, a voltage with respect to a third switching timing at which the resonant switch SWRES is controlled to be on or off is denoted by VRES. In other words, the resonant switch SWRES is turned off when VRES is 0, and the resonant switch SWRES is turned on when VRES is 1.

Figure 5:
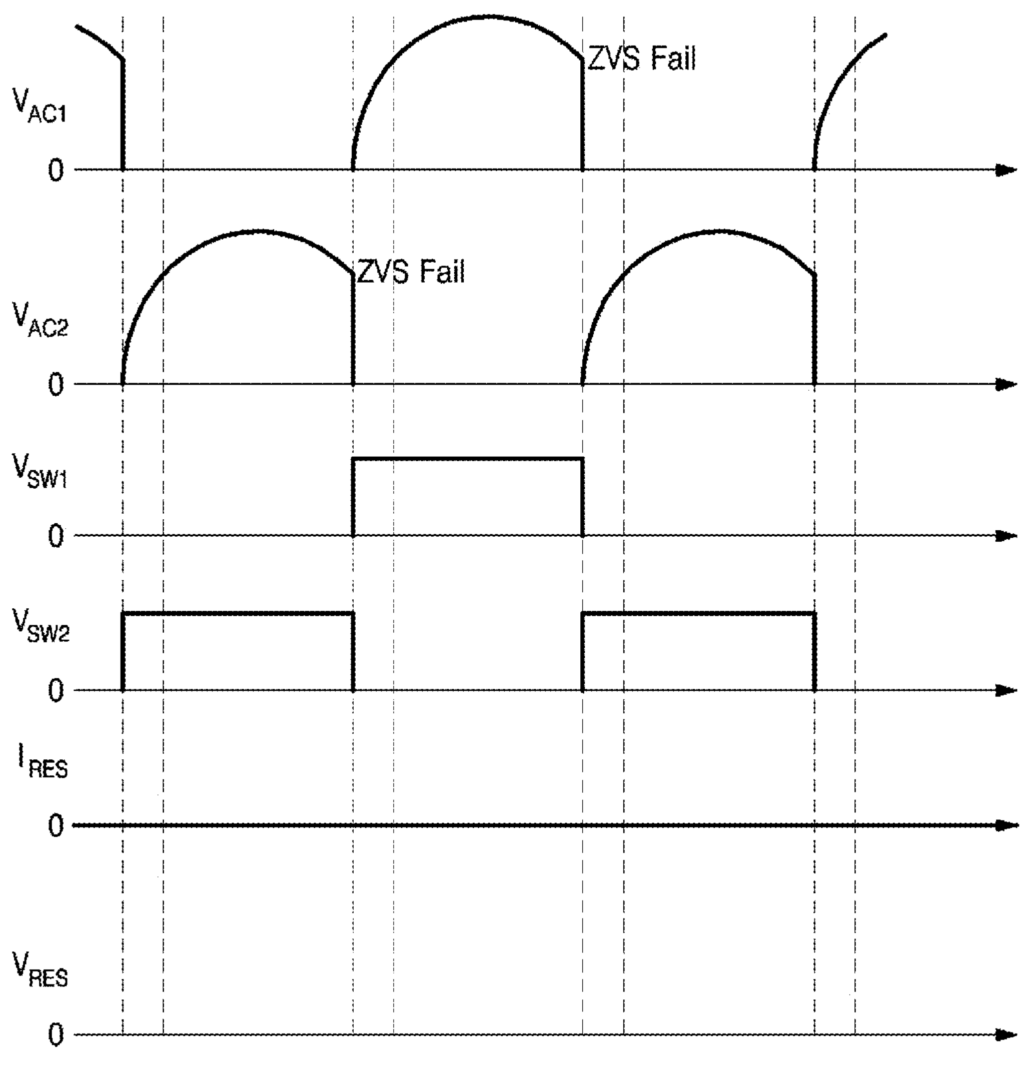
FIG. 5 is a diagram illustrating related waveforms when a full off-interval is not set between a first switching timing and a second switching timing.
Figure 6:
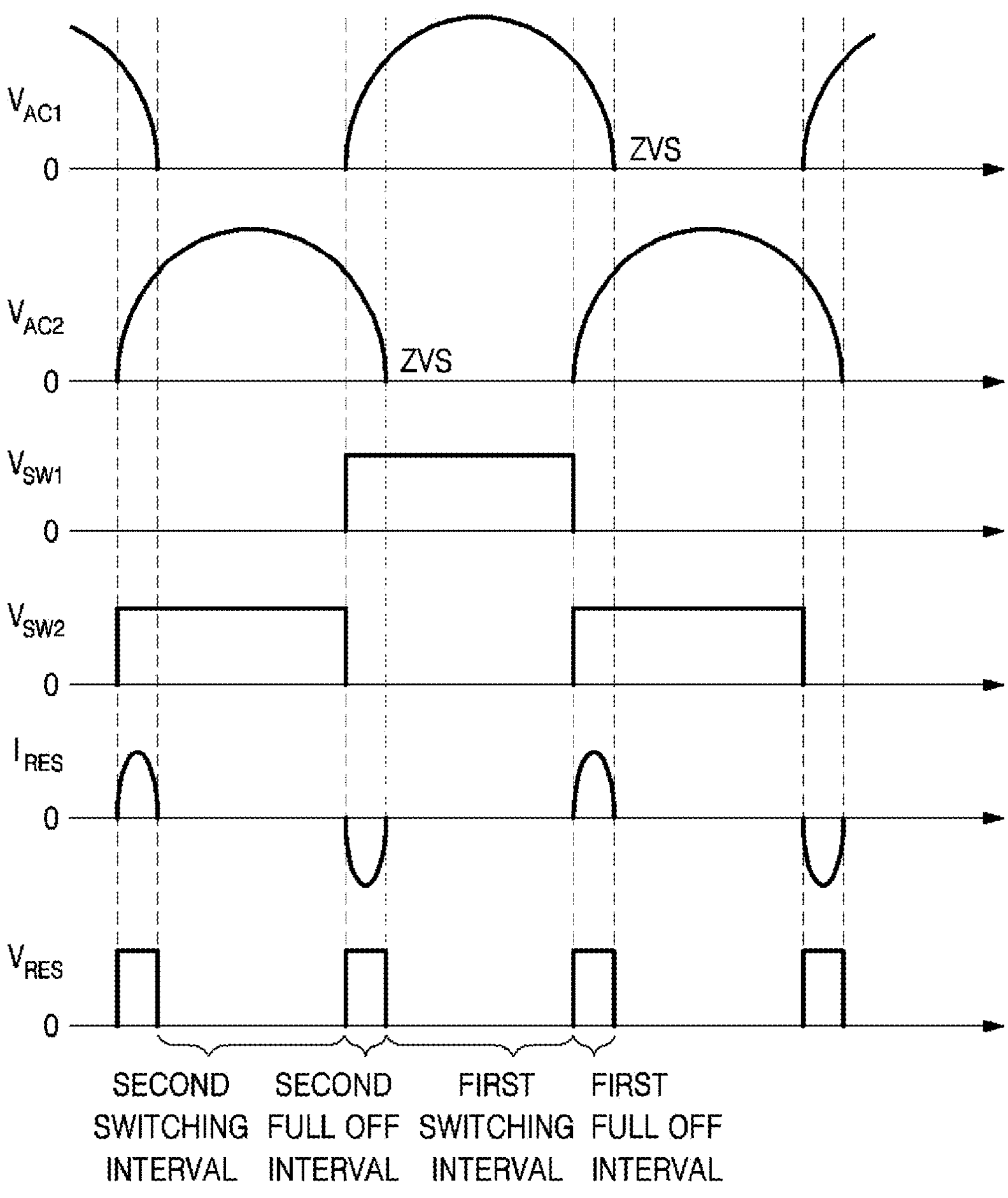
FIG. 6 is a diagram illustrating related waveforms when a full off-interval is set between the first switching timing and the second switching timing.

FIG. 5 is a diagram illustrating related waveforms when a full off interval is not set between the first switching timing and the second switching timing, and FIG. 6 is a diagram illustrating related waveforms when the full OFF interval is set between the first switching timing and the second switching timing.

As illustrated in FIG. 5, when the full OFF interval in which all of the first to fourth switches SW1, SW2, SW3, and SW4 are turned off is not set between a period in which the first switching timing VSW1 is 1 and a period in which the second switching timing VSW2 is 1, the third switching timing VRES is always 0.

When the second switching timing VSW2 becomes 1 at the time of transition of the first switching timing VSW1 to 0, transition of the second switching timing VSW2 from 0 to 1 occurs in a state in which VAC1 is not 0, and thus ZVS fails.

In addition, when the first switching timing VSW1 becomes 1 at the time of transition of the second switching timing VSW2 to 0, transition of the first switching timing VSW1 from 0 to 1 occurs in a state in which VAC2 is not 0, and thus ZVS fails.

On the other hand, as illustrated in FIG. 6, the controller 450 controls the first switching timing VSW1 and the second switching timing VSW2 such that a full off interval in which all of the first to fourth switches SW1, SW2, SW3, and SW4 are turned off is set between a period in which the first switching timing VSW1 is 1 and a period in which the second switching timing VSW2 is 1. In other words, the full off interval means an interval in which both of the first switching timing VSW1 and the second switching timing VSW2 are 0.

The controller 450 controls the switching timing VRES of the resonant switch SWRES such that the resonant switch SWRES is turned on at the start of the full off interval (first and second full off intervals) and the resonant switch SWRES is turned off at the end of the full off interval.

As illustrated in FIG. 6, the controller 450 performs control such that the third switching timing VRES becomes 1 in a period in which both the first switching timing VSW1 and the second switching timing VSW2 are off (i.e., 0) and thus the resonant switch SWRES is turned on.

That is, the controller 450 controls the third switching timing VRES such that the resonant switch SWRES is switched from an off state to an on state at the time of transition of the first switching timing VSW1 to an off state (i.e., the start of the first full off interval) in a state in which the first switching timing VSW1 is on and the second switching timing VSW2 is off (i.e., first switching interval).

Thereafter, at the end of the first full off interval, the controller 450 controls the third switching timing VRES such that the resonant switch SWRES is switched from the on state to the off state, and at the same time, switches the second switching timing VSW2 from the off state to the on state. In this case, since transition of the second switching timing VSW2 to the on state occurs when VAC1 is 0, ZVS is achieved.

In addition, the controller 450 controls the third switching timing VRES such that the resonant switch SWRES is switched from the off state to the on state at the time of transition of the second switching timing VSW2 to the off state (i.e., the start of the second full off interval) in a state in which the second switching timing VSW2 is on and the first switching timing VSW1 is off (i.e., second switching interval).

Thereafter, at the end of the second full off interval, the controller 450 controls the third switching timing VRES such that the resonant switch SWRES is switched from the on state to the off state, and at the same time, switches the first switching timing VSW1 from the off state to the on state. In this case, since transition of the first switching timing VSW1 to the on state occurs when VAC2 is 0, ZVS is achieved.

The controller 450 may be implemented to receive a control input for adjusting the duration of the full off interval (i.e., the first full off interval and the second full off interval) from a user.

That is, the controller 450 controls the duration of the first switching interval, the duration of the second switching interval, the duration of the first full off interval, and the duration of the second full off interval using the control input. Here, the duration of the first switching interval and the duration of the second switching interval may be equal to each other, and the duration of the first full off interval and the duration of the second full off interval may be equal to each other. In this case, the controller 450 may control the ratio between the duration of the first switching interval and the duration of the first full off interval.

Figure 7:
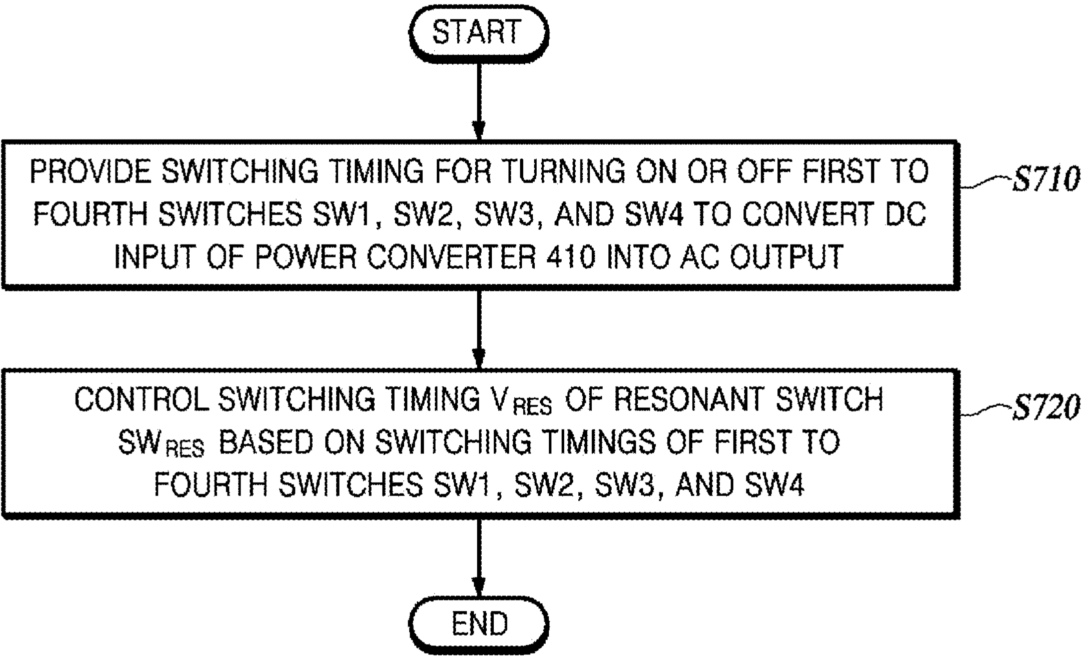
FIG. 7 is a flowchart illustrating a wireless power transmission method using a wireless power transmission device 400 according to the present embodiment.

FIG. 7 is a flowchart illustrating a wireless power transmission method using the wireless power transmission device 400 according to the present embodiment.

Hereinafter, the wireless power transmission method will be described with reference to FIG. 4 to FIG. 7.

The power converter 410 includes a full-bridge circuit composed of the first leg 411 including the first switch SW1 and the second switch SW2, and the second leg 412 including the third switch SW3 and the fourth switch SW4, and the controller 450 performs a first control process of converting a DC input of the power converter 410 into an AC output by providing a switching timing for turning on or off the first to fourth switches SW1, SW2, SW3, and SW4 (S710).

The resonant inductor circuit 420 includes the resonant inductor LRES and the resonant switch SWRES that are connected in series, and the controller 450 performs a second control process of controlling the switching timing VRES of the resonant switch SWRES based on the switching timings of the first to fourth switches SW1, SW2, SW3, and SW4 (S720).

At least some of the components described in the exemplary embodiments of the present disclosure may be implemented as hardware elements including at least one or a combination of a digital signal processor (DSP), a processor, a controller, an application-specific IC (ASIC), a programmable logic device (such as an FPGA), and other electronic devices. In addition, at least some of the functions or processes described in the exemplary embodiments may be implemented as software, and the software may be stored in a recording medium. At least some of the components, functions, and processes described in the exemplary embodiments of the present disclosure may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

| REFERENCE NUMERALS | |
|---|---|
| transmission device 400 | power converter 410 |
| first leg 411 | second leg 412 |
| inductor circuit 420 | capacitor circuit 430 |
| transmission coil 440 | controller 450 |

What is claimed is:

1. A wireless power transmission device comprising:

a power converter including a full-bridge circuit in which a first switch and a second switch form a first leg and a third switch and a fourth switch form a second leg and configured to convert a direct current (DC) input into an alternating current (AC) output by turning on or off the first to fourth switches;

a resonant inductor circuit including a resonant inductor and a resonant switch connected in series with each other and connected between two output nodes of the power converter;

a power transmission coil connected in parallel with the resonant inductor circuit between the two output nodes; and a controller configured to convert the DC input into the AC output by providing a switching timing for turning on or off the first to fourth switches and control a switching timing of the resonant switch based on switching timings of the first to fourth switches.

2. The wireless power transmission device of claim 1, wherein a positive terminal of the second switch is connected to a negative terminal of the first switch, a positive terminal of the fourth switch is connected to a negative terminal of the third switch, and the controller performs control such that a full off interval in which the first to fourth switches are turned off is formed between an on period of the first switch and the fourth switch and an on-period of the second switch and the third switch, and controls the switching timing of the resonant switch in the full off interval.

3. The wireless power transmission device of claim 2, wherein the controller controls the switching timing of the resonant switch such that the resonant switch is turned on at the start time of the full off interval and the resonant switch is turned off at the end of the full off interval.

4. The wireless power transmission device of claim 2, wherein the controller controls the switching timing of the resonant switch such that the resonant switch is switched from an off state to an on state at the time of transition of the first switch and the fourth switch from an on state to an off state.

5. The wireless power transmission device of claim 4, wherein the controller controls the switching timing of the resonant switch such that the resonant switch is switched from the on state to the off state at the time of transition of the second switch and the third switch from an off state to an on state.

6. The wireless power transmission device of claim 2, wherein the controller receives a control input and controls a duration of the full off interval according to the control input.

7. A wireless power transmission method of a wireless power transmission device including a power converter including a full-bridge circuit in which a first switch and a second switch form a first leg and a third switch and a fourth switch form a second leg, a resonant inductor circuit including a resonant inductor and a resonant switch connected in series with each other, and a power transmission coil connected in parallel with the resonant inductor circuit, the wireless power transmission method comprising:

a first control process of providing a switching timing for turning on or off the first to fourth switches to convert a DC input of the power converter into an AC output; and a second control process of controlling a switching timing of the resonant switch based on switching timings of the first to fourth switches.

8. The wireless power transmission method of claim 7, wherein a positive terminal of the second switch is connected to a negative terminal of the first switch, a positive terminal of the fourth switch is connected to a negative terminal of the third switch, the first control process comprises performing control such that a full off interval in which the first to fourth switches are turned off is formed between an on period of the first switch and the fourth switch and an on period of the second switch and the third switch, and the second control process comprises controlling the switching timing of the resonant switch in the full off interval.

9. The wireless power transmission method of claim 8, wherein the second control process comprises controlling the switching timing of the resonant switch such that the resonant switch is turned on at the start of the full off interval and the resonant switch is turned off at the end of the full off interval.

10. The wireless power transmission method of claim 8, wherein the second control process comprises controlling the switching timing of the resonant switch such that the resonant switch is switched from an off state to an on state at the time of transition of the first switch and the fourth switch from an on state to an off state.

11. The wireless power transmission method of claim 10, wherein the second control process comprises controlling the switching timing of the resonant switch such that the resonant switch is switched from the on state to the off state at the time of transition of the second switch and the third switch from an off state to an on state.

12. The wireless power transmission method of claim 8, wherein the second control process comprises receiving a control input and controlling a duration of the full off interval according to the control input.

* * * * *